Feb. 12, 1952 E. J. STACHURA 2,585,054

FLEXIBLE SHIELD FOR ELECTRIC CONDUCTORS

Filed March 10, 1949 2 SHEETS—SHEET 1

Inventor

Edward J. Stachura

By

ATTORNEY

Feb. 12, 1952 E. J. STACHURA 2,585,054

FLEXIBLE SHIELD FOR ELECTRIC CONDUCTORS

Filed March 10, 1949 2 SHEETS—SHEET 2

Inventor

Edward J. Stachura

By

ATTORNEY

Patented Feb. 12, 1952 2,585,054

UNITED STATES PATENT OFFICE 2,585,054

FLEXIBLE SHIELD FOR ELECTRIC CONDUCTORS

Edward J. Stachura, Arlington, Va.

Application March 10, 1949, Serial No. 80,704

3 Claims. (Cl. 174—36)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to electric shields, and particularly to flexible shields which are manually attachable about conductors or electrical apparatus.

It is frequently determined that after radio or electrical apparatus has been assembled, or installed, additional shielding is necessary to eliminate interference due to external sources; or to prevent undesirable coupling between circuits. Where these undesirable effects can be anticipated, corrective measures are included in the design of the equipment. In the case of connecting cables, shielded conductors are usually employed; in the case of apparatus, appropriate solid metal sheet is used to isolate the equipment from stray field effects.

The need for shielding against stray electrical fields is too well known in the art to require further justification herein. There is, however, presently no satisfactory shielding means available which will permit its installation about conductors or apparatus without requiring an overhaul of wiring and/or equipment, and, if the unit is in operation, consequent interruption in service. Several methods have been devised for providing additional shielding of conductors without necessitating their removal from a circuit. One method employs a metallic tape or ribbon which is wrapped about the conductor and then by means of a clamping device or adhesive, fixed in position. This is unsatisfactory since it is difficult to wrap installed conductors with the shield, and the situations which can be treated with a wrapped-on shield are very limited.

The present invention provides an extremely simple method of accomplishing additionally-required shielding of electrical circuit elements by means of well-known separable fasteners, used in conjunction with a flexible conducting woven wire braid material, without necessitating the removal of the elements from their installed locations.

Accordingly, it is a principal object of this invention to provide a novel flexible shield for radio and electrical apparatus which may be installed more conveniently and more effectively than heretofore possible.

A further object is to provide a flexible shield which is readily detachable without impairing its subsequent usefulness.

A still further object is to provide a flexible shield which may be made in various shapes and sizes for minimizing field effects about electrical and radio components.

It is also an object of this invention to provide a flexible shield which has a thin layer of insulation on one or both surfaces.

It is a still further object of this invention to provide a flexible readily-attachable electrical shield for electrical conductors which upon installation provides for the separation of conductors by means of appropriate partitions.

Other objects, advantages and features of the invention will, of course, become apparent and at once suggest themselves to those skilled in the radio and electrical art to which the invention is directed. The invention resides in the novel combination of a flexible metallic conductor and well-known fastening means, as hereinafter described and more particularly defined by the appended claims.

The foregoing and other objects and features of this invention may be more readily understood by reference to the following description of a few specific embodiments of the invention when read with reference to the attached drawings, in which Figure 1 is a plan view of a well-known type of slide fastener used on one embodiment of this invention.

Figures 1, 2, 3, 4, 5, 6:
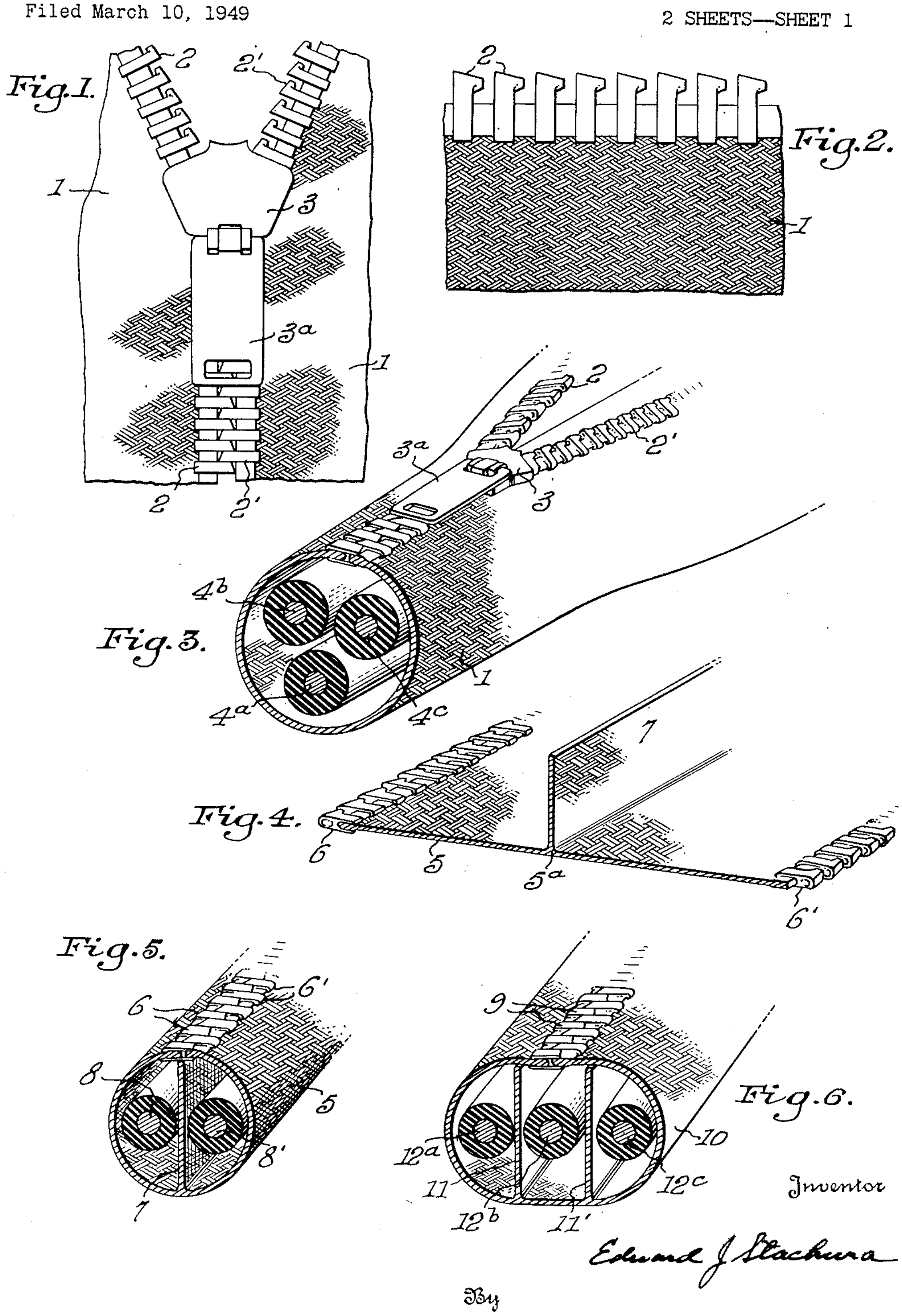
Figure 2 is a fragmentary view of a shield according to this invention showing one type of fastener element on a larger scale.
Figure 3 is a perspective view illustrating one application of the invention.
Figure 4 is a perspective section of one embodiment of the invention .
Figures 5 and 6 illustrate certain details of particular methods of application.

Referring now more particularly to the drawings, there is illustrated an attachable shield 1, which in various forms comprises essentially a flexible sheet of electrically conductive material adapted to encircle a conductor and having meeting but separable closure edges. These edges have mating and matched separable fasteners by which the sheet may be secured in position encircling and enclosing at least a part of the conductor. The fastener of Figure 1 is of the well-known slide type in which intermeshable jaws are carried by opposite strips 2 and 2a attached to respecting closure edges of the shield sheet, adapted to be brought into interlocking relation by a slide 3 operable by its usual pull tongue 3a. Shield 1 is preferably of a woven wire or braid of the type commonly used around shielded conductors. A slider 3 is moved along the series of fastener elements by a suitable actuating member or pull 3a, thereby engaging or disengaging the fastener elements. The action of the slide fastener and specific form of fastener elements is so well known that it is believed unnecessary to go into further detail in this respect.

Figure 2 illustrates by means of an enlarged view a fragment of the shield material which may be used in the practice of this invention. This view shows the manner in which the slide fastener elements may be attached to the shielding material. It follows that any of the numerous methods developed for the garment art may likewise be employed in the arrangement used. The manner of attaching slide fasteners to a woven or braided cloth tape is well known—and may readily be employed in the manufacture of shielding articles according to my invention.

Figure 3 illustrates a convenient embodiment of my invention which is in the form of an elongated woven strip or wire braid comprising the shield proper, and provided with one type of slide fastener having complements along opposite longitudinal edges. In this figure conductors 4 are completely embraced by the metallic shield 1 through the inter-engaging action of elements 2 when the slide 3 is operated. It is obvious that if necessary the shield permits its ready removal and later its reinstallment.

Figure 4 illustrates an important embodiment of the invention since frequently it is necessary to shield conductors from each other for the purpose of reducing hum, cross-talk and similar disturbances. In this instance a partition piece 7 may be made an integral part of the main shield 5 by folding at 5a, or it may be a member attached by wire stitching, soldering, or other attaching means. Fastener elements 2 and 2a are applied to opposite edges of the main sheet 5 and may be of any suitable type.

Figure 5 illustrates one application of the shield of Figure 4. Conductors 8 and 8′ are shielded from each other through the interposition and action of partition 7.

Figure 6 illustrates another embodiment of the invention wherein two partitions 11 and 11′ are employed to separate conductors 12a, 12b, and 12c. Shield body sheet 10 is usually connected to ground at some convenient point. Fastener elements 9 are shown in an engaged condition, holding the opposite edges of the main sheet together.

Figure 7:
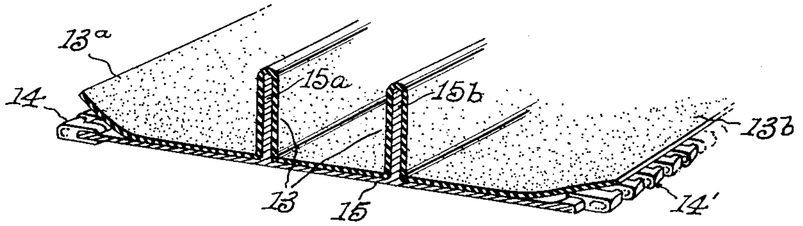
Figure 7 shows a perspective view of an embodiment of the invention wherein an insulating lining is employed.

In Figure 7 a shield 15 or main sheet of braided wire is shown. The inner surface of the shield is provided with a layer or lining of insulation 13, such as flexible rubber. Fastener elements 2 and 2′ are applied thereto as before indicated but spaced inwardly of at least one edge, so that overlapping edge portions 13a and 13b of the main sheet provide a means of completely encircling and insulating the included conductors from the shield. Septum elements 15a and 15b are covered with the insulating lining 13 thus providing additional insulation between the circuit element to be shielded and the conducting portions of the shield.

Figure 8:
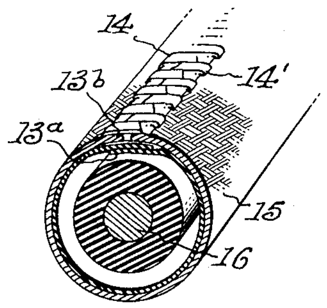
Figures 8, 9 and 10 illustrate the manner of application of the invention as a shield for electrical conductors.

Figure 8 illustrates one application of the shield provided with insulating lining to shield a conductor 16 against electrical fields. Edge portions 13a and 13b of the insulating lining are shown in their overlapped position, and fastener elements 14 and 14′ are shown engaged. The conducting shield 15 will normally be connected to a suitable ground. It should be noted that through the use of a shield of either form additional insulation is provided for the conductor. With the insulated type of shield in situations which require the shielding of uninsulated components with a minimum liability of shorting a shielded member.

Figure 9:
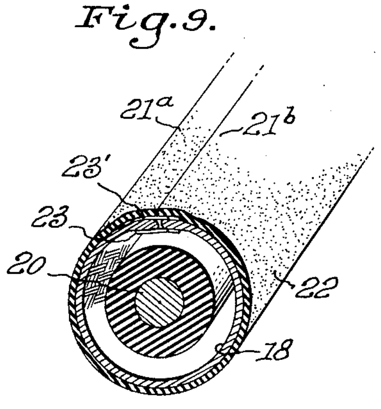

In Figure 9, a shield 18 according to this invention is provided with an insulating outer coating 22. Through the use of a fairly resilient insulating cover the insulation can be made to completely cover the conducting portions of the shield, including the fastener. Figure 9 shows a conductor 20 provided with a metallic shield 18 having an insulating coating 22. As shown it will be seen that slide fastener elements 23 and 23′ are protected by edges 21a and 21b of the insulating outer coating.

Figure 10:
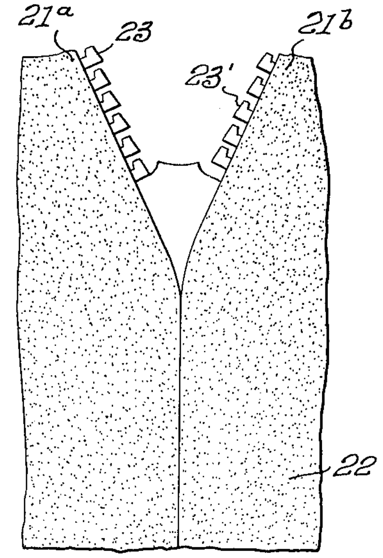

Figure 10 illustrates by means of an enlarged view a fragment of the shield of Figure 9. This view shows the manner in which the outer insulating cover 22 is used to completely enclose the shield and particularly the fastener elements 23 and 23′.

The metal braid in each of the above applications is usually grounded either by soldering it to previously grounded apparatus, or by means of a suitably applied or attached grounding wire connected to an appropriate ground.

While during the above discussion reference was repeatedly made to a metallic braid, it is to be understood that the shielding material may be in several well-known types. The shield may be made of threads of insulated wires. Or some of the wires comprising the metallic web may be conducting and others insulating. The invention resides in the use of separable fasteners in combination with a flexible shield material.

The fasteners may be the conventional manufacture for plackets in garments, in which a cloth tape carries each series of jaws, one series having the slide thereon and stops at each end to prevent removal of the slide, while the other is formed with a terminal starter piece to be inserted in the slide to bring the two series into matching relation so as to mesh when the slide is moved along the two series. The cloth tapes may be stitched to the shield material with fiber thread whether the shield be of woven wire or sheet metal. Alternatively the tape may be of woven fine wire, and may be secured to the shield sheet by stitches of suitable conductive wire.

Still other variations are possible. The novel shield herein described can readily be made into various shapes and sizes. The sheet forming the essential shield may be of such shape as may be required to adapt it to fit the particular conductor or joint to be shielded. For ordinary cable end-to-end couplings, it may be rectangular; for a tapered joint, it may be in the form of a frustum of a truncated triangle; while for L-joints, T-joints, etc., it may be correspondingly formed with complementary fasteners along opposite edges of two or more arms of the pattern, and respective sliders provided for each set. Containers could be made of metal equipped with covers which would be attached by means of slide fasteners. Individual shielding compartments could also be readily made.

Shields could also be made of magnetic materials and be used either in or out of circuit to screen against magnetic effects.

Having thus described my invention, I claim:

1. An electromagnetic shield for electrical conductors comprising a flexible conducting sheet member having longitudinal edges and foldable to form a substantially tubular enclosure with edges in abutment, at least one longitudinal conducting septum element integrally formed at one longitudinal edge only with said conducting sheet member and free at an opposite longitudinal edge, said septum element having a height from the shield member to said free edge at least equal to the diameter of said conductors, and coacting separable fastener members affixed to said edges of said sheet member.

2. An electrical shielding article for transmission lines comprising a sheet of flexible conducting material having an inner and an outer surface and two longitudinal edges, a plurality of laterally spaced longitudinal conducting septum elements each integrally formed at one of its longitudinal edges only with said conducting material on said inner surface, coacting separable fastener members attached to the first-named edges of the sheet, said members being electrically conductive and in electrical contact with said sheet, a coating of insulating material covering said inner surface of said sheet and said septum elements.

3. An electrical shield device for electrical circuit elements comprising a sheet of flexible conducting material having an inner and outer surface and two longitudinal edges, a plurality of laterally spaced longitudinal conducting septum elements each affixed at one of its longitudinal edges only with said conducting material and on the inner surface thereof, coacting separable fastener members attached to the first named edges of the sheet, said members being electrically conductive and in electrical contact with said sheet.

EDWARD J. STACHURA.

REFERENCES CITED

The following references are of record in the file of this patent:

UNITED STATES PATENTS

| Number | Name | Date |
|---|---|---|
| 2,120,301 | Tishman | June 14, 1938 |
| 2,159,627 | Byrne | May 23, 1939 |
| 2,287,134 | Robertson | June 23, 1942 |
| 2,522,072 | Tierney, Jr. | Sept. 12, 1950 |